(12) United States Patent
Massie et al.

(10) Patent No.: US 6,612,160 B2
(45) Date of Patent: Sep. 2, 2003

(54) APPARATUS AND METHOD FOR ISOLATING AND MEASURING MOVEMENT IN METROLOGY APPARATUS

(75) Inventors: James R Massie, Santa Barbara, CA (US); Roger B Proksch, Santa Barbara, CA (US)

(73) Assignee: Veeco Instruments, Inc., Plainview, NY (US)

( * ) Notice: Subject to any disclaimer, the term of this patent is extended or adjusted under 35 U.S.C. 154(b) by 32 days.

(21) Appl. No.: 09/803,268

(22) Filed: Mar. 9, 2001

(65) Prior Publication Data

US 2002/0124636 A1 Sep. 12, 2002

(Under 37 CFR 1.47)

(51) Int. Cl.[7] .................................................. G01B 7/34
(52) U.S. Cl. ....................... 73/105; 250/306; 250/227.26; 250/234
(58) Field of Search .......................... 73/105; 250/306, 250/307, 227.26, 234

(56) References Cited

U.S. PATENT DOCUMENTS

| | | | |
|---|---|---|---|
| 5,172,002 A | 12/1992 | Marshall | 250/306 |
| 5,196,713 A | 3/1993 | Marshall | 250/306 |
| 5,440,920 A * | 8/1995 | Jung et al. | 73/105 |
| 5,519,212 A | 5/1996 | Elings et al. | |
| 5,656,769 A * | 8/1997 | Nakano et al. | 73/105 |
| 5,705,814 A * | 1/1998 | Young et al. | 250/306 |
| 5,714,682 A * | 2/1998 | Prater et al. | 73/105 |
| 5,835,251 A | 11/1998 | Toda et al. | |
| 5,912,461 A * | 6/1999 | Ando et al. | 250/306 |
| 5,939,719 A | 8/1999 | Park et al. | |
| 5,949,070 A * | 9/1999 | Gamble | 250/306 |

OTHER PUBLICATIONS

Veeco Metrology Group, "DEKTAK SXM 300 Atomic Force Microscope, Service Manual, Version 1.00," p. 25–38, (copyright 1994–1998).

* cited by examiner

Primary Examiner—Daniel S. Larkin
(74) Attorney, Agent, or Firm—Boyle Fredrickson Newholm Stein & Gratz S.C.

(57) ABSTRACT

An improved metrology apparatus, such as a scanning probe microscope (SPM), has an actuator that controls motion in three orthogonal directions when it is selectively and electrically stimulated. The X-Y section of the actuator, preferably a piezoelectric actuator, controls motion in the X and Y-directions and the Z-section of the actuator controls motion in the Z-direction. A flexure is attached to the actuator and is mounted on a reference structure to prevent unwanted X and Y-motion by the Z-section of the actuator from moving a probe attached to the flexure. Preferably, two mirrors are mounted on the flexure. In operation of the SPM, a light beam is directed towards these mirrors. When the flexure moves in the Z-direction, one of the mirrors is deflected and causes the reflected light to move across a detector, generating a signal representative of a change in the Z-position of the flexure and the probe.

63 Claims, 9 Drawing Sheets

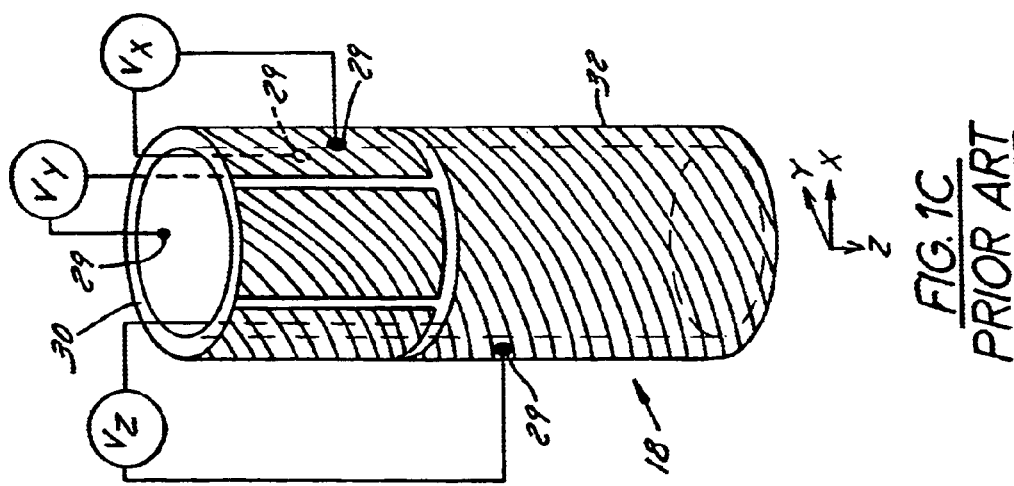
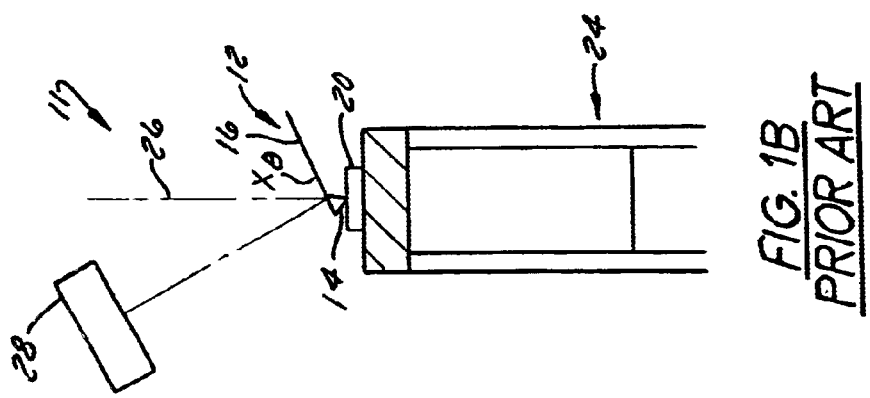
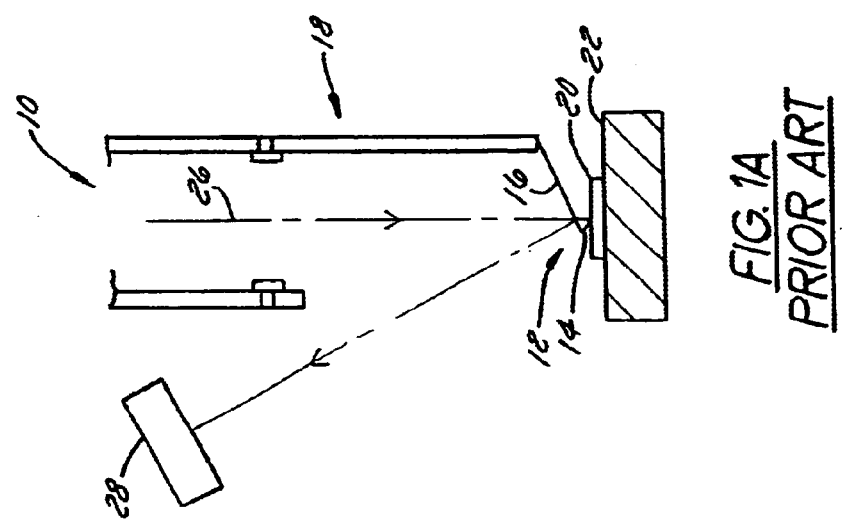

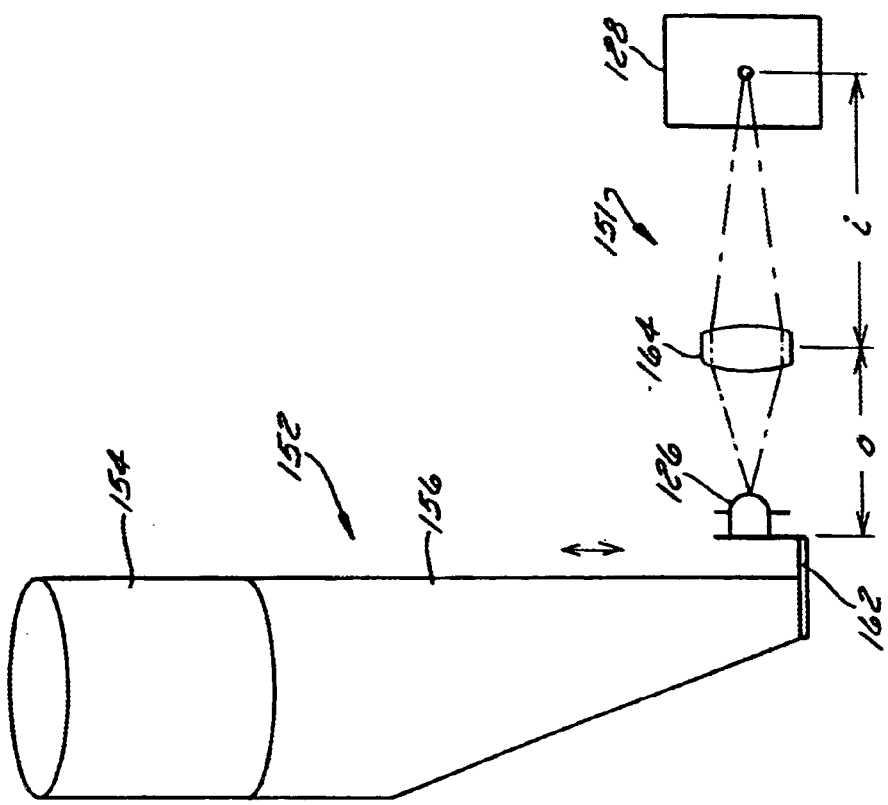
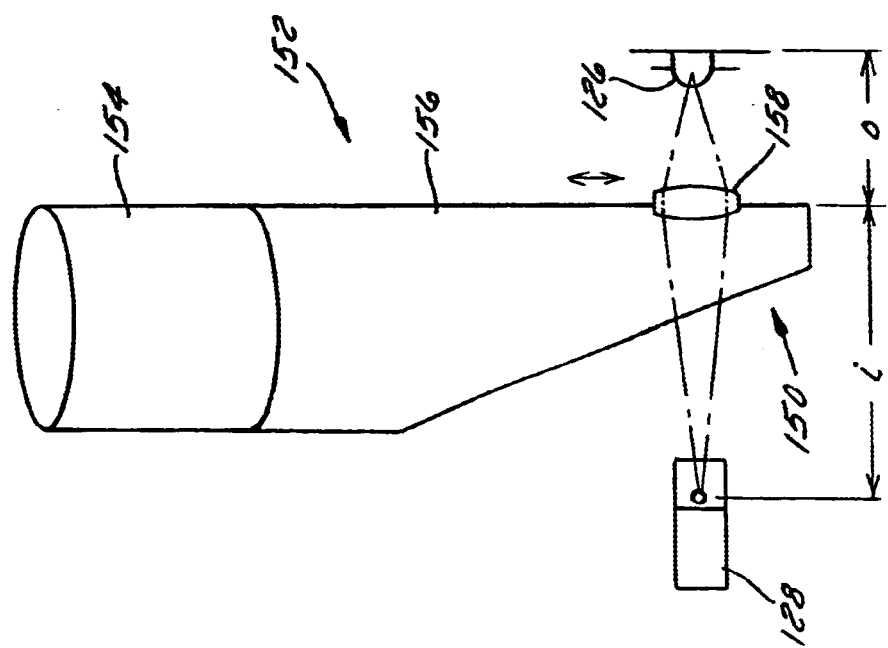

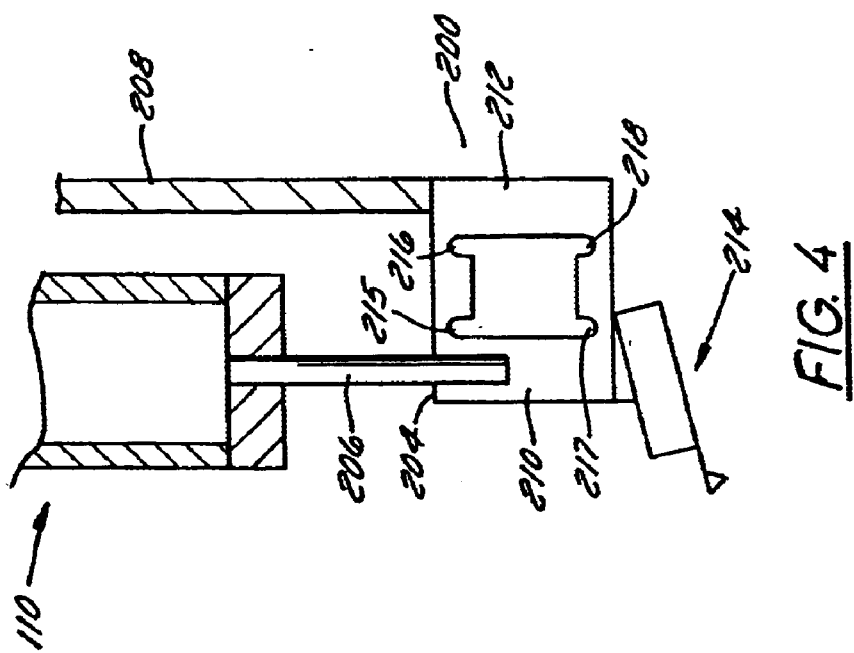
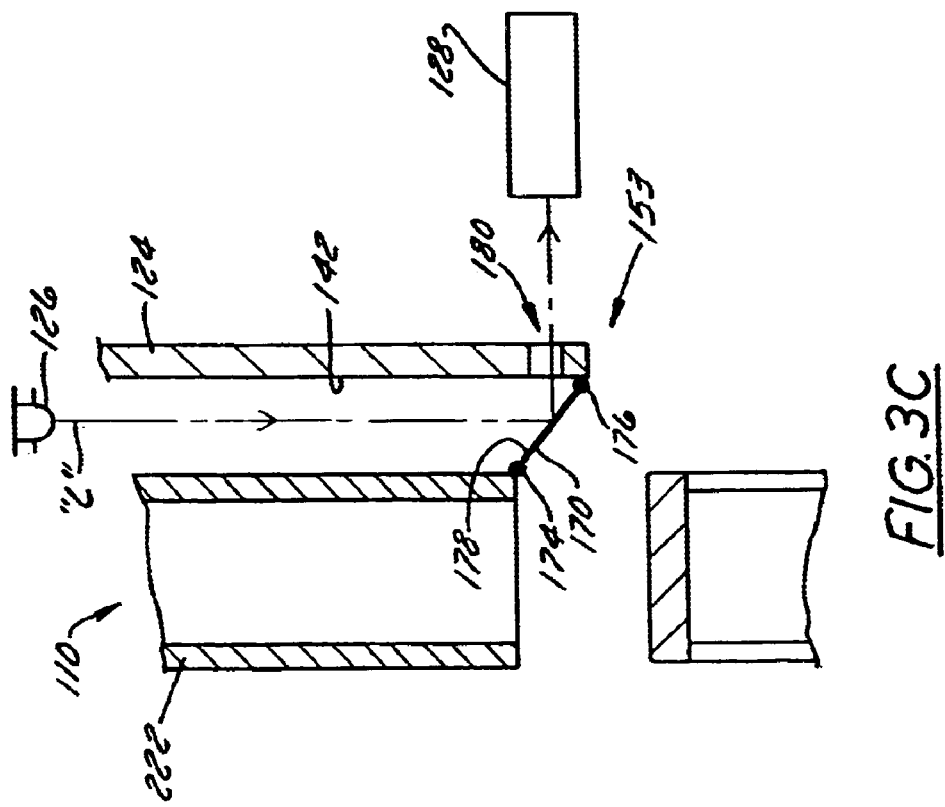

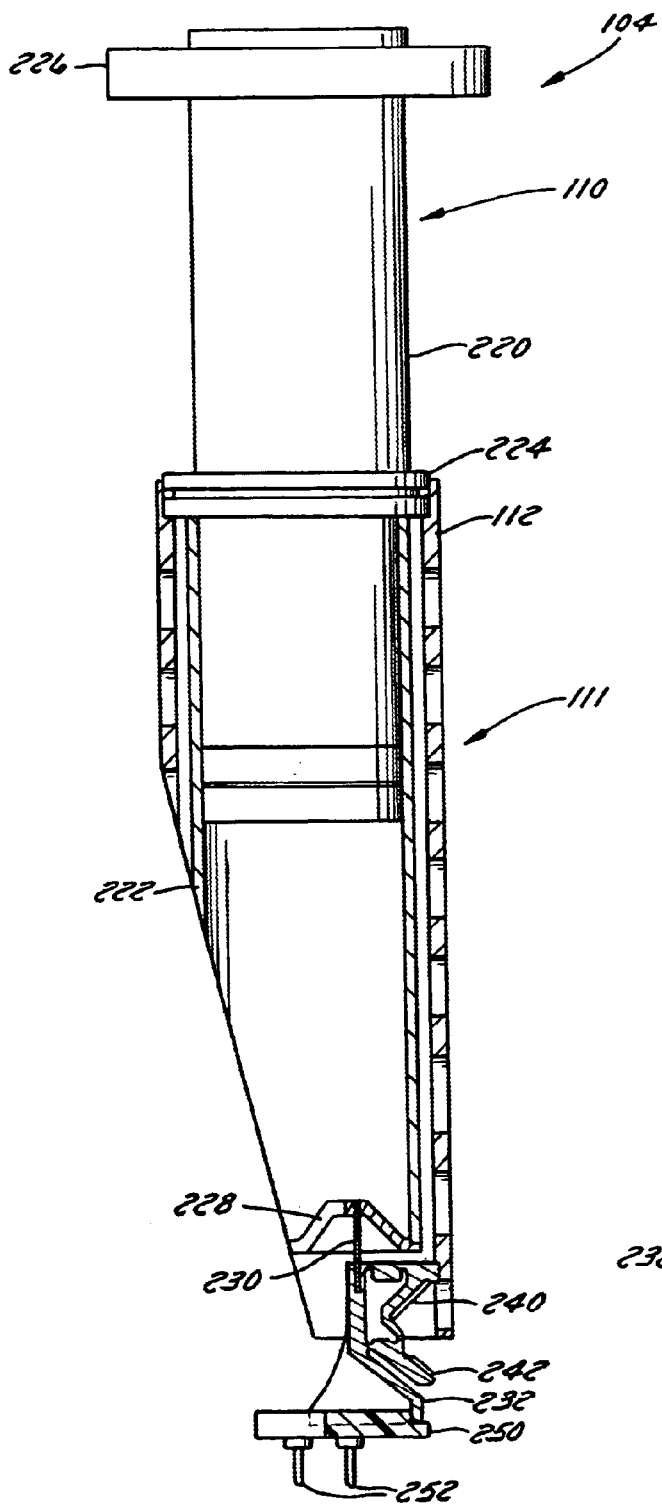
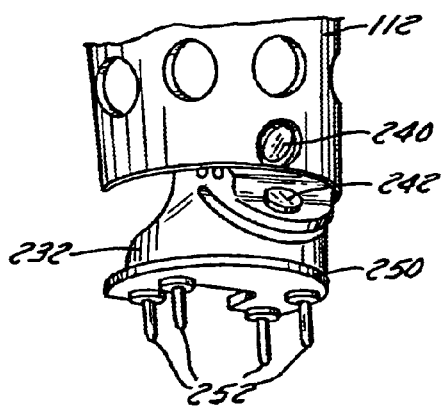
FIG. 5
FIG. 6

US 6,612,160 B2

APPARATUS AND METHOD FOR ISOLATING AND MEASURING MOVEMENT IN METROLOGY APPARATUS

BACKGROUND OF THE INVENTION

1. Field of the Invention

This invention relates to scanning probe microscopes (SPMs) and other related metrology apparatus. More particularly, it is directed to apparatus and methods for measuring the movement of a probe of, for example, an SPM, and minimizing the negative effects associated with parasitic movement of such a probe.

2. Discussion of the Prior Art

Scanning probe microscopes are typically used to determine the surface characteristics of a sample, commonly biological or semiconductor samples, to a high degree of accuracy, down to the Ångstrom scale. Two common forms of the scanning probe microscope are shown in FIGS. 1A and 1B. A scanning probe microscope operates by scanning a measuring probe assembly having a sharp stylus over a sample surface while measuring one or more properties of the surface. The examples shown in FIGS. 1A and 1B are atomic force microscopes ("AFMs") where a measuring probe assembly 12 includes a sharp stylus 14 attached to a flexible cantilever 16. Commonly, an actuator such as a piezoelectric tube (often referred to hereinafter as a "piezo tube") is used to generate relative motion between the measuring probe 12 and the sample surface. A piezoelectric tube is a device that moves in one or more directions when voltages are applied to electrodes disposed inside and outside the tube (29 in FIG. 1C).

In FIG. 1A, measuring probe assembly 12 is attached to a piezoelectric tube actuator 18 so that the probe may be scanned over a sample 20 fixed to a support 22. FIG. 1B shows an alternative embodiment where the probe assembly 12 is held in place and the sample 20, which is coupled to a piezoelectric tube actuator 24, is scanned under it. In both AFM examples in FIGS. 1A and 1B, the deflection of the cantilever 16 is measured by reflecting a laser beam 26 off the back side of cantilever 16 and towards a position sensitive detector 28.

One of the continuing concerns with these devices is how to improve their accuracy. Since these microscopes often measure surface characteristics on the order of Ångstroms, positioning the sample and probe with respect to each other is critical. Referring to FIG. 1C, as implemented in the arrangement of FIG. 1A, when an appropriate voltage ($V_x$ or $V_y$) is applied to electrodes 29 disposed on the upper portion 30 of piezoelectric tube actuator 18, called an X and Y-axis translating section or more commonly an "X-Y tube," the upper portion may bend in two axes, the X and Y-axes as shown. When a voltage ($V_z$) is applied across electrodes 29 in the lower portion 32 of tube 18, called a Z-axis translating section or more commonly a "Z-tube," the lower portion extends or retracts, generally vertically. In this manner, portions 30, 32 and the probe (or sample) can be steered left or right, forward or backward and up and down. This arrangement provides three degrees of freedom of motion. For the arrangement illustrated in FIG. 1A, with one end fixed to a microscope frame (for example, 34 in FIG. 1D), the free end of tube 18 can be moved in three orthogonal directions with relation to the sample 20.

Unfortunately, piezoelectric tubes and other types of actuators are imperfect. For example, the piezo tube often does not move only in the intended direction. FIG. 1D shows an undesirable, yet common, case where a piezo tube actuator 18 was commanded to move in the Z-direction (by the application of an appropriate voltage between the inner and outer electrodes, 29 in FIG. 1C), but where, in response, the Z-tube 18 moves not only in the Z-direction, but in the X and/or Y-directions as well. This unwanted parasitic motion, shown in FIG. 1D as $\Delta X$, limits the accuracy of measurements obtained by scanning probe microscopes. Similar parasitic motion in the Y-direction is also common. The amount of this parasitic motion varies with the geometry of the tube and with the uniformity of the tube material, but typically cannot be eliminated to the accuracy required by present instruments.

Current methods of monitoring the motion of the probe or sample 20 when driven by a piezoelectric tube are not sufficiently developed to compensate for this parasitic X and Y-error. The devices are typically calibrated by applying a voltage to the X-Y tube and the Z-tube, and then measuring the actual distance that the probe travels. Thus, the position of the free end of the piezo tube is estimated by the voltage that is applied to the X-Y tube and the Z-tube. However, because the (X,Y) position error introduced by the Z-tube on the probe (or on the sample for the arrangement shown in FIG. 1B) is essentially random, it cannot be eliminated merely by measuring the voltage applied to the Z-tube or to the X-Y tube.

Moreover, with respect to movement in the intended direction, piezoelectric tubes and other types of actuators typically do not move in a predictable way when known voltages are applied. The ideal behavior would be that the actuator move in exact proportion to the voltage applied. Instead actuators, including piezo tubes, move in a non-linear manner, meaning that their sensitivity (e.g., nanometers of motion per applied voltage) can vary as the voltage increases. In addition, they suffer from hysteresis effects. Most generally, the response to an incremental voltage change will depend on the history of previous voltages applied to the actuator. This hysteresis effect, thus, can cause a large prior motion to affect the response of a commanded move, even many minutes later.

Notably, also, vertical measurements in scanning probe microscopy are typically made by moving the probe up or down in response to the rising or falling sample surface. For example, for AFM operation in tapping mode, the actual vertical measurement is the average distance the probe moves in the vertical direction to maintain a constant oscillation magnitude as it taps the surface, while for AFM operation in contact mode, the vertical measurement is the distance the probe moves to maintain a particular amount of force between the cantilever stylus and the sample surface. This distance is often calculated mathematically by recording the voltage applied to the piezoelectric tube and then multiplying by the tube's calibrated sensitivity in nm/V. But as mentioned previously, this sensitivity is not constant and depends on the previous voltages applied to the tube. So using the voltage applied to the tube to calculate the vertical motion of the tube will always result in an error with respect to the actual motion. This error can translate directly into errors when measuring surface topography of a sample.

What is needed, therefore, is an apparatus and method for controlling the motion of the probe or sample to minimize the effects due to, for example, adverse parasitic motion introduced by an actuator (e.g., a Z-tube) in a metrology apparatus. Moreover, an apparatus is needed to measure the magnitude of the intended motion to, for example, track whether intended motion is being realized.

SUMMARY OF THE INVENTION

The present invention is directed to an apparatus and method for controlling the motion of a metrology probe to minimize negative effects associated with parasitic motion introduced, for example, by an actuator (e.g., a Z-tube) in a metrology apparatus such as an SPM or a profiler. In addition, the apparatus measures the magnitude of the actual motion. Notably, the apparatus implements an optical detection apparatus, utilizing an arrangement of reflecting surfaces disposed in corner-cube retroreflector-like relationship, so that the light reflected and sensed by the apparatus is relatively immune to, for example, lateral deflections of components of the microscope coupled thereto.

According to first aspect of the preferred embodiment, a Z isolating/measuring assembly for a metrology apparatus includes a piezoelectric or electrostrictive actuator assembly including a first actuator stage configured to controllably move in first and second orthogonal directions, and a second actuator stage integrated with or coupled to the first actuator stage, and being configured to controllably move in a third direction orthogonal to the first and second orthogonal directions. In addition, the assembly includes a reference structure having first and second ends wherein the first end is fixed relative to movement of the second actuator stage. The assembly also includes a multi-bar linkage assembly fixed to the second end of the reference structure, and a coupling attached to the second actuator stage and to the multi-bar linkage, wherein the second actuator stage and the coupling move the linkage in the third orthogonal direction in a manner that substantially isolates the linkage from any second actuator stage motion in the first and second directions.

According to another aspect of the invention, a Z isolating/measuring assembly includes an elongate actuator with a longitudinal axis having a fixed end, and a free end configured to translate in three orthogonal directions with respect to the fixed end. In addition, the assembly includes a multiple bar linkage having first and second links mutually constrained to translate with respect to each other, and wherein the first link is fixed to a reference structure and the second link is constrained to translate in a direction parallel to the longitudinal axis of the actuator. The assembly also has a coupling having first and second ends, the first end being fixed to the actuator proximate to its free end, and the second end being fixed to the second link, the coupling adapted to transmit force and therefore displacement in a direction substantially parallel to the longitudinal axis of the actuator.

According to yet another aspect of the invention, a method of reducing positioning errors at the free end of an elongate actuator of a metrology apparatus includes the step of supporting a probe assembly on a probe support assembly. In addition, the method includes supporting the probe support assembly at a first end to a reference structure of the metrology apparatus, the reference structure being substantially insensitive to longitudinal expansion or contraction of the elongate actuator. The method further includes isolating the reference structure from a longitudinal tube deflection of the actuator. When driving the actuator, the metrology apparatus simultaneously generates both longitudinal deflections as well as lateral deflections in the longitudinally expanding and contracting portion. The method operates to prevent the lateral deflections generated in the longitudinally expanding and contracting portion of the tube from laterally deflecting the probe support assembly, while simultaneously transmitting the longitudinal deflections to the probe support assembly.

According to yet another aspect of the preferred embodiment, an apparatus for measuring movement of an actuator in a metrology apparatus such as a scanning probe microscope (SPM) includes an optical measuring device having a light source that generates a light beam, the measuring device being configured to change the direction of the beam in response to movement of the actuator. The apparatus also includes a sensor to detect the beam position and generate a signal indicative of the movement of the actuator.

According to another aspect of this embodiment, the measuring device includes a movable bar assembly coupled to the actuator and to a reference structure, wherein the bar assembly has a reflecting surface that is adapted to deflect the beam. Moreover, the bar assembly is responsive to movement of the actuator so as to change the direction of the deflected beam.

According to a further aspect of the preferred embodiment, a method for measuring movement of an actuator in a metrology apparatus such as a scanning probe microscope (SPM) includes the steps of providing a movable bar assembly coupled to the actuator and to a reference structure. Moreover, the method includes measuring, in response to movement of the actuator, movement of the movable bar assembly, wherein movement of the movable bar assembly is indicative of movement of the actuator.

According to another aspect of the preferred embodiment, an apparatus for ensuring that displacement generated by an actuator, and transferred to the cantilevered probe coupled thereto, is isolated from movement of the metrology apparatus in a direction other than the intended direction associated with the actuator, includes a flexure that is coupled to the actuator via a flexible bar or member (i.e., a coupling). The coupling is adapted to transmit displacement only in an intended direction, thus minimizing adverse affects associated with parasitic movement of at least a portion of the metrology apparatus, such as the actuator. The apparatus also includes a fixed reference structure to which the flexure is also attached. Preferably, the flexure is a parallelogram flexure comprising a four bar linkage that is adapted to translate so that its opposed vertical links remain generally orthogonal to the X-Y plane in response to force and therefore displacement transmitted in the vertical or "Z" direction by the coupling, this outcome due at least in part to the connection of the flexure to the reference structure.

According to a still further aspect of the preferred embodiment, in a metrology apparatus such as a scanning probe microscope (SPM) having an actuator for moving a probe in a particular direction, a reference assembly that generally decouples movement in a direction other than the particular direction from the probe, the reference assembly including a reference structure and a probe support assembly coupled to the reference structure and to the actuator, wherein the probe is attached to the probe support assembly. Further, the apparatus includes a flexible bar having opposed ends, one of which is coupled to the actuator and the other of which is coupled to the probe support assembly, wherein the flexible bar, the reference structure, and the probe support assembly are adapted to collectively decouple movement of the metrology apparatus in a direction other than the particular direction from the probe.

Moreover, the flexible bar is preferably more flexible in response to displacements applied thereto in any direction other than the particular direction than to a displacement applied in the particular direction.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 1A is a partial side elevational view of a prior art atomic force microscope utilizing a scanned stylus and including a three-axis piezoelectric actuator assembly;

FIG. 1B is a partial side elevational view of a prior art atomic force microscope utilizing a scanned sample and including a three-axis piezoelectric actuator assembly;

FIG. 1C is a perspective view of a prior art piezoelectric tube actuator of an atomic force microscope;

FIGS. 3A–3C illustrate alternate embodiments of the optical detection apparatus shown in FIG. 3;

FIG. 4 is a partial side elevation cross-sectional view of an apparatus for decoupling movement of the microscope in a direction other than a particular intended direction from a probe assembly of a scanning probe microscope, according to the present invention;

FIG. 5 is a side elevation cross-sectional view of the piezoelectric actuator assembly shown in FIG. 2;

FIG. 6 is an enlarged perspective view of the lower portion of the piezoelectric actuator assembly of FIG. 5;

DETAILED DESCRIPTION OF THE PREFERRED EMBODIMENTS

Figure 2:
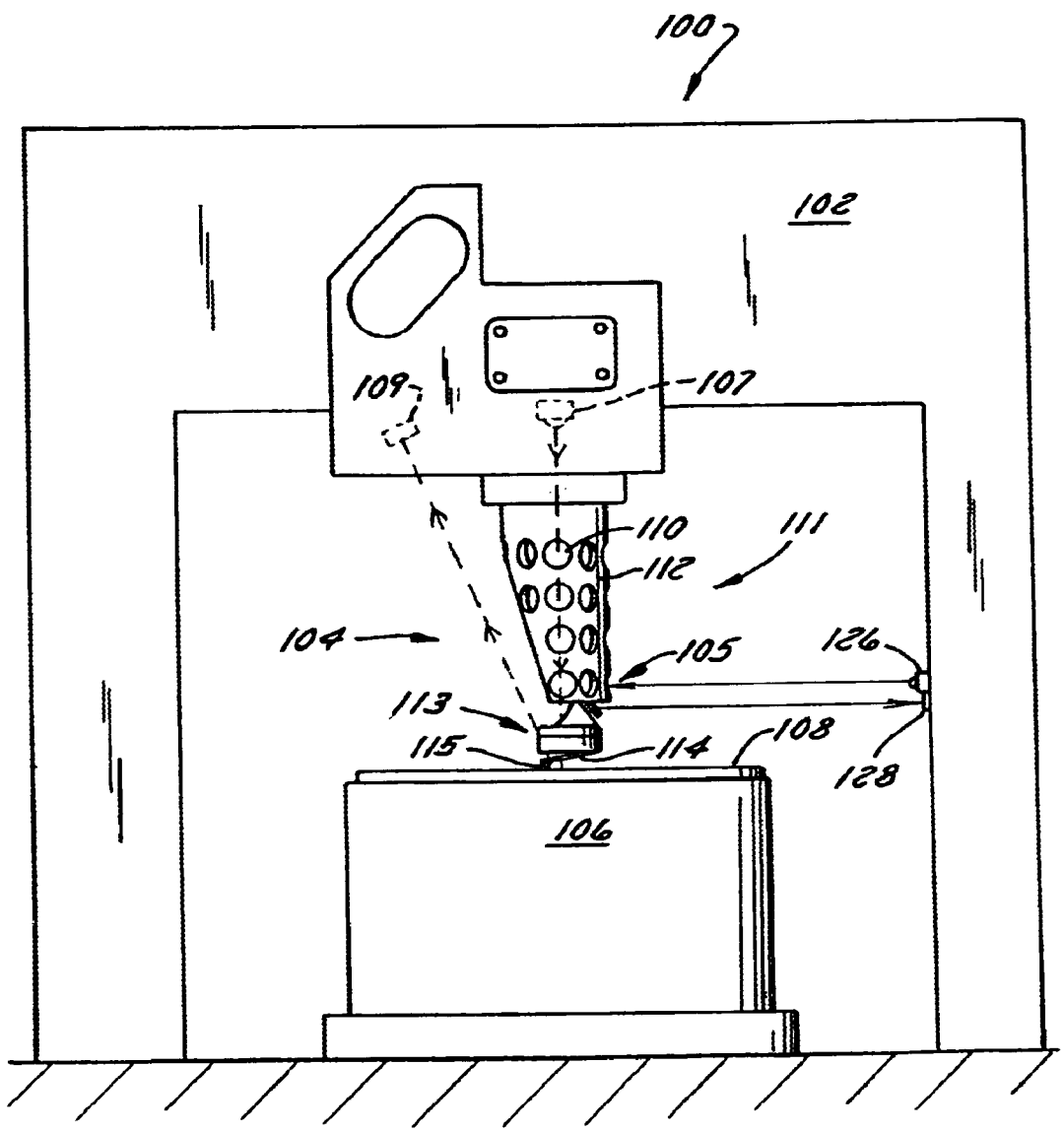
FIG. 2 is a side elevational view of a scanning probe microscope assembly according to the present invention.

Referring initially to FIG. 2, a scanning probe microscope (SPM) 100 is shown. The microscope includes a chassis including a support 102 to which an actuator assembly 104 is attached. In addition, a sample base 106 is fixed to support 102 and is configured to accommodate a sample 108. The actuator assembly 104 includes an actuator 110, a reference assembly 111 comprising, among other structure, an elongate reference structure 112 that surrounds actuator 110, and a probe assembly 113. Preferably, reference structure 112 is tubular and has a longitudinal axis that is generally collinear with the longitudinal axis of actuator 110. Notably, actuator 110 can be piezoelectric or electrostrictive, and can be a tube actuator or another type of actuator conventional in the art of nanopositioning systems.

At a lower free end 105 of actuator assembly 104, a probe assembly 113 is attached and includes a cantilever 114 having a stylus 115 attached thereto. During operation, stylus 115 is scanned across the surface of sample 108 to determine surface characteristics (e.g., topography) of the sample. The scanning operation is provided by actuator 110, which is driven by program-controlled signals (e.g., appropriate voltages) to cause the actuator 110 to move laterally in two dimensions across the surface of sample 108, as well as to extend and retract the probe assembly 113, i.e., to move cantilever 114 toward or away from the sample, typically in response to closed loop signals derived from sensor 109. As a result, the actuator 110 preferably can translate the cantilever 114 in three orthogonal directions under program control. Note that for convenience we will refer to the extending and retracting of the probe assembly 113 toward and away from sample 108 as motion in the Z-direction, and translation laterally across the surface of the sample as motion in the X-direction and the Y-direction, where the X and the Y-axes are orthogonal to each other and define a plane substantially parallel to the surface of sample 108. This nomenclature is used purely for convenience to indicate three orthogonal directions.

Figure 1D:
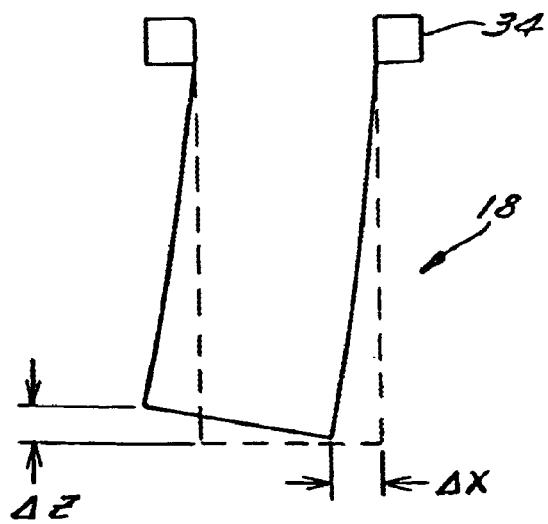
FIG. 1D is a front elevational view illustrating parasitic motion of a piezoelectric actuator assembly configured to move in a predetermined direction, in this case "Z"
Figure 3:
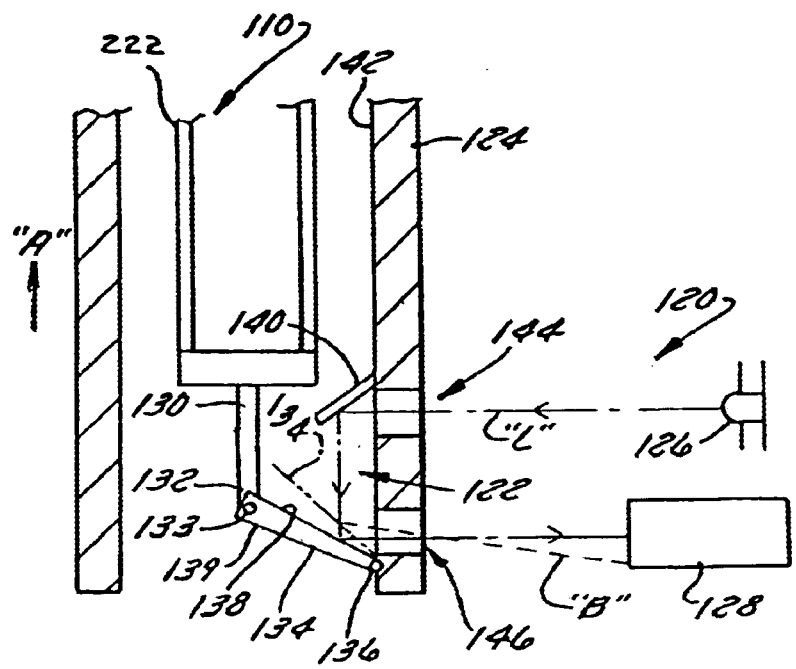
FIG. 3 is a side elevation partial cross-sectional view of an optical detection apparatus for measuring the intended motion of a piezoelectric actuator according to the present invention.

Next, to illustrate different aspects of the preferred embodiment, we initially turn to FIG. 3, which shows a measuring apparatus for monitoring movement of a piezoelectric Z-tube 222 of an actuator 110. An optical measuring device 120 includes a steering mechanism 122 and couples actuator 110 to a reference frame 124, the frame being fixed relative to actuator 110. In addition, steering mechanism 122 acts as a probe support assembly to which a probe assembly (not shown) is attached. In operation, a beam of electromagnetic radiation such as light "L" is generated by a light source 126 and is directed at steering mechanism 122. Steering mechanism 122 changes the direction of the light beam in response to movement of actuator 110. This change in direction of the beam is detected by a detection sensor 128 and, because in this case tube 222 is a Z-tube, the change in direction of the beam is indicative of vertical actuator movement.

More particularly, steering mechanism 122 includes a movable bar assembly having a coupling bar or first link 130 having a first end attached to Z-tube 222 and a second end 132. Steering mechanism 122 also includes a movable bar or second link 134 having opposed ends, the first of which is rotatably attached to the second end 132 of link 130 at a first pivot point 133. The opposite end of the movable bar 134 is rotatably attached to fixed reference frame 124 at point 136. Movable bar 134 defines a surface 138, which is adapted to reflect light beam "L." A second reflecting surface preferably comprises a fixed mirror 140 attached at an angle to an inner surface 142 of fixed reference frame 124 to deflect incoming light beam "L" towards movable bar 134. Moreover, to accommodate the light beam, fixed reference frame 124 includes a first aperture 144 adapted to receive the incoming light beam, and a second aperture 146 adapted to allow passage of the beam, after being reflected by bar 134, through fixed reference frame 124 and towards detector 128.

In operation, in response to actuation of actuator 110 (for example, in the Z-direction marked "A" in FIG. 3), movement of the actuator is transferred to movable bar 134 via coupling bar 130. This causes the movable bar 134 to rotate generally in a clockwise fashion about second pivot point 136. As a result, the steered beam is deflected towards detector 128 at an angle different than when Z-tube 222 is not actuated. This change in the direction of the light beam "L" is depicted by the path marked "B" in FIG. 3 and is indicative of the amount of actuator movement. More particularly, as the actuator 110 is used to move the probe (not shown, but preferably coupled to a bottom surface 139 of movable bar 134) in the Z direction, the amount of movement in the Z-direction is sensed by the system by noting the position at which the deflected light beam contacts the sensor 128.

Turning to FIGS. 3A–3C, alternate embodiments of the measuring device 120 as illustrated in FIG. 3 are shown. In FIG. 3A, measuring device 150 includes a light source 126 that is fixed relative to a piezoelectric actuator assembly 152 that comprises an upper X-Y actuator portion or stage 154 coupled to a lower Z-tube actuator portion or stage 156. In this case, movement of Z-tube 156 is being monitored.

Measuring device 150 also includes a lens 158 that is coupled to Z-tube 156. Notably, light source 126 is positioned such that lens 158 is intermediate the light source and a sensor 128 disposed at a position generally opposite the light source 126. In operation, as Z tube 156 is actuated and caused to move in a particular direction (in this case "Z"), lens 158 correspondingly moves. Because sensor 128 is fixed, as is light source 126, measuring the position at which the light beam "L" output by lens 158 contacts sensor 128 is indicative of the movement of the actuator 152. Preferably, the magnification of the lens equals, $$M = 1 + i/o \qquad \text{Eqn. 1}$$

where "i" is the orthogonal distance from sensor 128 to lens 158, and "o" is the orthogonal distance from lens 158 to light source 126.

Turning to FIG. 3B, light source 126, rather than the lens 158 as in FIG. 3A, is mounted to the actuator 152 whose movement is to be measured (in this case the "Z" actuator 156). In this embodiment, a measuring device 151 includes light source 126 attached to actuator 156 via a mount 162, and a sensor 128 is included which is fixed relative to the actuator 152 and the light source 126. In addition, a lens 164 is positioned intermediate light source 126 and sensor 128 and has a magnification generally equal to, $$M = i/o \qquad \text{Eqn. 2}$$

where "i" is the orthogonal distance between lens 164 and the sensor 128, and "o" is the orthogonal distance between light source 126 and lens 164. As the Z-tube is actuated, light source 126 moves in conjunction with it, thus causing light passing through lens 164 to be directed at a point displaced from the point at which the light is directed on sensor 128 when Z-tube 156 is not actuated. Sensor 128 detects this displacement and generates a corresponding signal indicative of the amount of actuator 156 movement.

In yet another alternate embodiment of the optical measuring device, shown in FIG. 3C, a measuring device 153 directs a light beam "L" between actuator 110 (e.g., a piezoelectric tube 222) and fixed frame 124 (which is preferably tubular and surrounds actuator 110) in a direction generally parallel to the longitudinal axes of actuator 110 and tubular fixed frame or reference structure 124. Measuring device 153 includes a link 170 having opposed ends, the first of which is coupled to actuator 110 (for example, a Z actuator) at a first pivot point 174, and the second of which is pivotably coupled to fixed frame 124 at a second pivot point 176. In operation, the light beam "L" is directed towards link 170, which comprises reflective surface 178, such that the beam is reflected towards the inside surface 142 of fixed frame 124. Similar to the embodiment shown in FIG. 3, fixed frame 124 is configured to include an aperture 180 to allow passage of the reflected beam so as to allow impingement of the beam on sensor 128. As the actuator 110 is activated, link 170 rotates and the angle at which the beam is reflected changes, thus causing the reflected or output beam to impinge upon the sensor 128 at a different location than when the actuator is not activated. This different position detected by sensor 128 is indicative of the amount of displacement of the actuator 110, as discussed previously.

Turning to FIG. 4, an apparatus 200 is illustrated for ensuring that displacements generated by an actuator, and transferred to the cantilevered probe coupled thereto, are isolated from movement of the actuator in a direction other than the intended direction of the actuator, e.g., isolated from parasitic movement of the actuator. Generally, an actuator 110 is coupled to a flexure 204 via a flexible bar or member (i.e., a coupling) 206 that is adapted to transmit displacement only in an intended direction, thus minimizing adverse affects associated with parasitic movement of the metrology apparatus, such as actuator 110. In FIG. 4, for example, actuator 110 is preferably a Z tube actuator. Therefore, in that case, coupling 206 is configured so as to transmit displacement generated by actuator 110 in the Z direction, but generally not in the X and Y directions. Note that the remaining discussion of FIG. 4 assumes actuator 110 is a Z-tube actuator.

Next, apparatus 200 includes a fixed reference structure 208 to which flexure 204 is also attached. Flexure 204 is preferably a parallelogram flexure comprising a four bar linkage that is adapted to translate so that its opposed vertical links 210, 212 remain generally orthogonal to the X-Y plane in response to force and therefore displacement transmitted in the vertical or "Z" direction by bar 206. This movement of flexure 204 is rotation about points 215, 216, 217 and 218 thereof, as described in further detail below in conjunction with FIG. 7.

Again, to ensure that the opposed vertical links of the flexure 204 move in this fashion, the flexible element 206 is configured so as to be sufficiently rigid to transmit vertical displacements of actuator 110, but flexible enough to decouple, for example, the parasitic X-Y movement of the actuator 110 from the flexure 204. Flexible element 206 may be on the order of 3 mm long and 0.2 mm in diameter, for instance. A probe 214 is coupled to link 210 of flexure 204. As a result, probe 214 of the SPM moves substantially only in the intended direction in response to activation of actuator 110, in this case Z. Because in a preferred embodiment reference structure 208 is coupled to an X-Y actuator assembly (e.g., 220 in FIG. 5), reference structure 208 moves in conjunction therewith, thus transmitting this intended X-Y motion to flexure 204. As a result, probe 214 can move in the X and Y-directions. Notably, this intended X-Y motion is not inhibited by bar 206 because bar 206 is generally flexible in response to displacements directed in the X and Y-directions. Such a decoupling arrangement is employed in the AFM shown in FIGS. 2, 5, and 7, and therefore a more specific description of the apparatus and its operation is provided in conjunction therewith immediately below.

Figure 7:
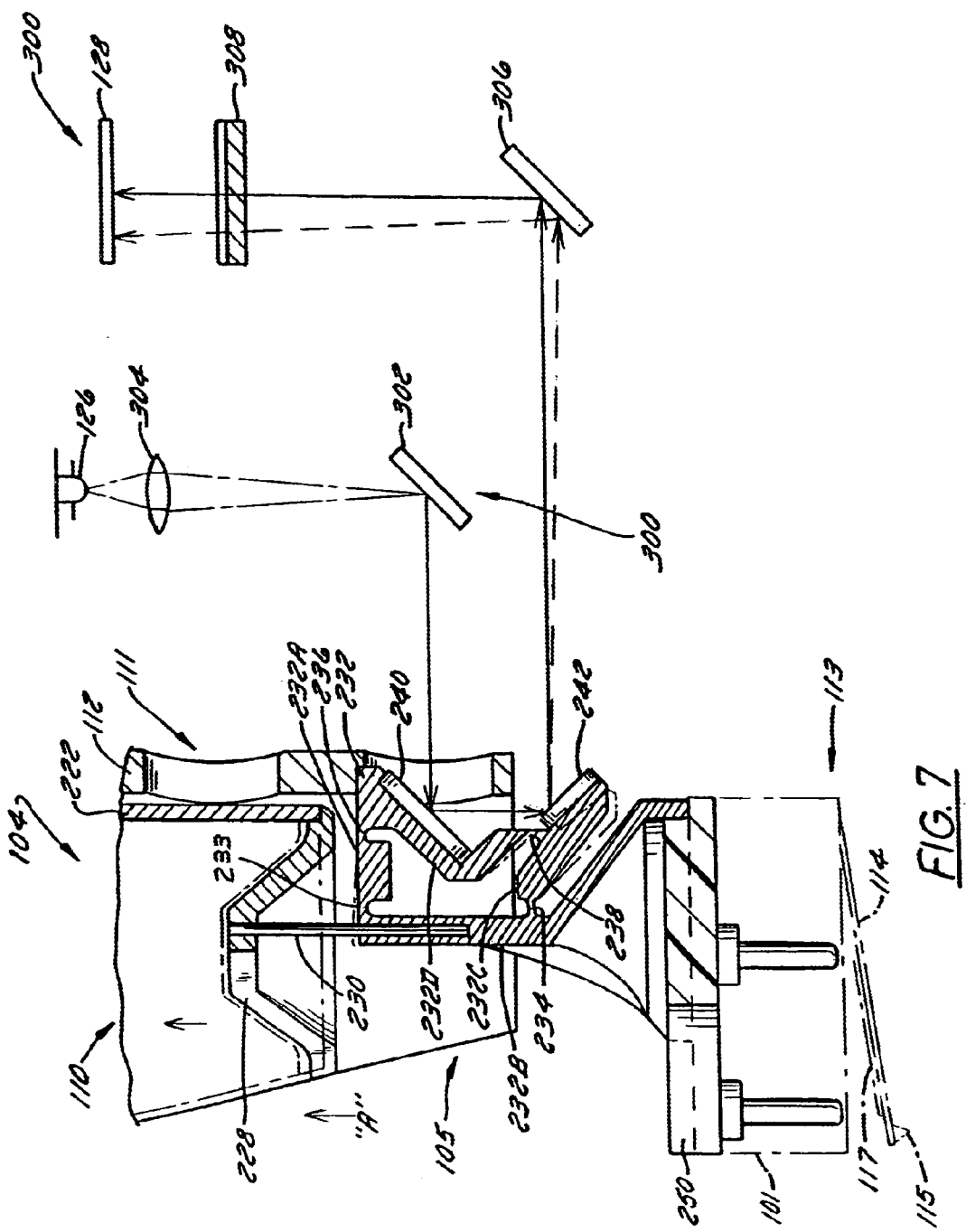
FIG. 7 is a partial side elevation cross-sectional view of the lower portion of the piezoelectric actuator assembly shown in FIG. 5, illustrating movement of the actuator, and corresponding movement of the flexure, in phantom.

Referring to FIGS. 2 and 7, an electromagnetic radiation source 126 (e.g., a laser) is fixed to support 102. In operation, source 126 directs light towards a lower portion 105 of actuator assembly 104, while detector 128 receives light from light source 126 after it has reflected off this lower portion 105 so as to monitor the amount of actuator movement. Electromagnetic radiation detector 128 is fixed relative to support 102 as well, and is employed as part of a measuring device 300 (alternately, see FIG. 3 at 120, for example) to determine the amount of translation of at least part of actuator 110.

With more specific reference to FIG. 7, source 126 of measuring device 300 may be mounted so as to direct a beam of light generally vertically toward a mirror 302 positioned to deflect the beam towards the lower portion 105 of assembly 104. Preferably, a focusing lens 304 is disposed between light source 126 and mirror 302. The beam is then deflected toward a sensor 128 (e.g., a position sensing photodiode) via mirror 306. A cylindrical lens 308 may be disposed between mirror 306 and sensor 128 (or can be located at any point between source 126 and sensor 128 as desired) to again enhance precision.

Still referring to FIGS. 2 and 7, to monitor, for example, topographical changes on the surface of the sample and provide appropriate feedback depending on the mode of SPM operation, an electromagnetic radiation source 107 (shown in FIG. 2) is faxed to support 102. Source 107 generates radiation that is directed through actuator 110 towards a mirror 117 supported by a surface of cantilever 114 of probe assembly 113. Mirror 117, in turn, directs the radiation toward detector 109 (shown in FIG. 2). Mirror 117 may, in the alternative, be a polished portion of the back (upper) side of the cantilever 114. Detector 109 receives the light reflected from probe 114 and, in turn, generates a signal indicative of, for example, the deflection of probe 114, as is conventional in the art.

The entire actuator assembly 104 is shown in more detail in FIG. 5. Again, actuator assembly 104 includes actuator 110 (preferably a piezoelectric tube) and reference assembly 111 which in turn comprises reference structure 112, coupling mount 228, flexible bar coupling 230, flexure 232, and slotted disk 250 as described in detail below. In this preferred embodiment actuator 110 is formed of two sections; first, an upper section 220 that is configured to deflect laterally in a plane lying perpendicular to the axis of the actuator under program control. For this reason it is termed an X-Y tube. The actuator 110 also includes a lower Z-tube actuator 222 which is adapted to extend or retract in a direction substantially parallel to the longitudinal axis of the tube under program control. A discussion of a means for controlling such actuators can be found, for example, in U.S. Pat. No. 6,008,489 and other related applications.

The two tubes 220, 222 of the piezoelectric actuator 110 are coupled together end-to-end proximate to a circular collar 224 that extends around and is fixed to the actuator 110. Also, the assembly 104 is preferably coupled to frame 102 (FIG. 2) of the scanning probe microscope with a flange 226 that is fixed to the top of X-Y tube 220. In this preferred embodiment, tubular member or elongate reference structure 112 of reference assembly 111 extends around at least the Z-tube 222 of the actuator 110 and is fixed to collar 224. Collar 224, in turn, is fixed to the actuator 110 at or near the junction of the upper and lower actuator sections. When X-Y tube 220 is driven under program control, it deflects in a direction generally perpendicular to the longitudinal axis. Since collar 224 and hence structure 112 are fixed to the actuator near the bottom of X-Y tube 220, they also deflect laterally.

On the other hand, when Z-tube 222 is driven under program control it does not extend or retract collar 224. Hence structure 112 will not extend or retract since it is coupled to collar 224. Therefore, when Z-tube 222 extends or retracts, it extends or retracts relative to structure 112. This causes a substantial change in the relative position of the two at the lower (or free) end of Z-tube 222.

The semi-circular coupling mount 228 is fixed to the lower end of Z-tube 222 and translates together with Z-tube 222 when Z-tube 222 extends and retracts. Reference assembly 111 also includes the flexible bar coupling 230 that, in turn, is fixed to coupling mount 228. Bar 230 is configured so that when Z-tube 222 extends and retracts, the bar correspondingly extends and retracts with respect to structure 112.

Referring again to FIG. 7, the lower end of flexible bar coupling 230 is fixed to the probe support assembly or flexure 232 of reference assembly 111. Flexure 232 is preferably formed out of a solid block of material, and comprises aluminum or a similarly light alloy. The flexure 232 is generally in the form of a movable bar assembly or four bar linkage. These links are identified in FIG. 7 as 232A, 232B, 232C and 232D.

Flexible bar coupling 230 is fixed to link 232B of flexure 232. When Z-tube 222 retracts in the direction marked "A," for example, bar 230 translates with the free end of Z-tube 222. Because Z-tube 222 is retracting, bar 230 is pulled upwardly toward the upper end of the actuator. This causes link 232B to translate upwardly substantially the same distance that the end of Z-tube 222 translates upwardly.

Link 232B is supported at flexible joints 233 and 234 to links 232A and 232C, respectively. Links 232A and 232C are coupled to link 232D at flexible joints or linkages 236 and 238, respectively. When link 232B is pulled upwardly (again in the direction marked "A") from a relaxed position, as shown in phantom in FIG. 7, links 232A and 232C are deflected upwardly at one end by link 232B. The other end of links 232A and 232C generally rotate about joints 236 and 238 (also shown in phantom).

Links 232A and 232C are preferably of generally equal length and are parallel to each other. Similarly, links 232D and 232B are preferably of equal length and parallel to each other. Link 232D is fixed to the lower end of structure 112. Because structure 112 does not translate upwardly or downwardly when Z-tube 222 moves upwardly or downwardly (due to its connection to collar 224 fixed on actuator 110 above the Z-tube 222) any expansion or contraction of Z-tube 222 upwardly or downwardly causes the four bar linkage of flexure 232 to deflect about joints 233, 234, 236, and 238. Preferably, thickness $t_1$, of each of the links is approximately 0.9 mm, while the thickness $t_2$ of each of the joints is approximately 0.08 mm.

Thus, when the four bar linkage made of the links 232A–D is deflected upwardly or downwardly, they form a parallelogram arrangement and there is substantially no rotation of link 232B, only translation. As a result, link 232B is preferably constrained to simply translate upwardly or downwardly.

In operation, electromagnetic radiation from source 126 is reflected off a mirror 240 of measuring device 300, mirror 240 being mounted on flexure 232, particularly link 232D. This light is reflected downwardly and is reflected again, this time off a mirror 242, which is also fixed to flexure 232, particularly link 232C. The light reflected off mirror 242 then is directed towards detector 128, which generates a signal indicative of the location at which the reflected light impinges upon the detector 128. The signal provided by detector 128 changes depending upon the degree of deflection of the four bar linkage of flexure 232.

More particularly, comparing the relaxed position of the flexure 232 in FIG. 7 to the upwardly deflected position shown in phantom, it is clear that upward deflection of link 232B causes link 232C to rotate about joint 238. This in turn causes mirror 242 to rotate about joint 238. This movement of mirror 242 causes the light beam to reflect off mirror at a different angle than when the beam is reflected off the mirror 242 when the flexure is in the relaxed position. As a result, the beam moves to a position on the detector 128 which is displaced from the initial location of the beam, as shown in phantom. It is this change in the position of light impinging on detector 128 that causes a change in the signal generated by detector 128, and hence, provides an indication that link 232B has translated upwardly or downwardly with respect to the free end of structure 112 to which link 232D is fixed.

Notably, mirrors 240 and 242 are preferably disposed with respect to each other such that the light sensed by detector 128 is substantially immune to lateral deflections of member 112. In the embodiment shown in the figures, there are several structural elements that individually and collectively contribute to this immunity. In particular, mirrors 240 and 242 are disposed to return light to the detector 128 in a path substantially parallel to the path of the light impinging upon mirror 240 of measuring device 300, and thus form what is akin to a corner cube retro-reflector. As Z-tube 222 moves, mirrors 240, 242 maintain their general orthogonal relationship, albeit in displaced fashion, thus affording accurate measurements of Z-displacement. Another feature that contributes to this accuracy is the fact that the path of light impinging upon mirror 240 and the path of light reflected from mirror 242 are substantially parallel to the surface of the sample (108 in FIG. 2).

When structure 112 is deflected laterally across the surface of the sample, by activation of X-Y tube 220 (FIG. 5) for example, mirrors 240 and 242 are also deflected. This occurs whether or not there has been any upward or downward motion of Z-tube 222 with respect to member 112. Due to the arrangement of the incoming and outgoing beams from mirrors 240 and 242 and the orientation of those mirrors with respect to each other, any lateral deflection will not substantially change the signal impinging on detector 128, and detector 128 will continue to generate a signal indicative of the height of the flexure 232 (and particularly link 232B), and therefore the probe above the sample generally without error.

The above-described apparatus is thus used to isolate the movement of Z-tube 222 in its intended Z-direction, yet permit free lateral motion of the lower end 105 of actuator assembly 104. At the lower end of actuator assembly 104, reference assembly 111 includes slotted disk 250 having four mounting pins 252 (see FIG. 6), the slotted disk being fixed to the lower portion of link 232B. Next, probe assembly 113 includes a probe base 101 (shown in FIG. 7 in phantom lines) that can be plugged or unplugged from pins 252 to hold the probe base 101 onto the slotted disk 250. Probe assembly 113 also includes cantilever 114 fixed on one end to the probe base 101, and a stylus 115 attached to the free end of cantilever 114.

Referring again to FIGS. 2 and 7, light source 107 (shown in FIG. 2) generates light which travels down through the actuator 110, and is reflected off mirror 117 and returns to detector 109 (shown in FIG. 2). Whenever cantilever 114 is flexed upwardly or downwardly about its mounting point, mirror 117 rotates about the fixed end of cantilever 114 and causes the light generated by source 107 to move with respect to detector 109. This movement, in turn, causes a change in the signal generated by detector 109 that indicates a change in the amplitude of the deflection of cantilever 114, and hence a change in the force and/or distance relationship of the probe assembly 113 and the sample surface 108.

Typically, to determine the height of various features at different locations on the sample surface, probe assembly 113 is moved laterally across the surface of the sample 108. In operation, to direct the probe laterally, an electrical signal is applied to X-Y tube 220 (FIG. 5), which in turn causes the lower portion 105 of the actuator assembly 104 to deflect in relation to the sample. Depending upon the signals applied to X-Y tube 220, this can cause probe assembly 113 to move in two orthogonal directions across the surface of the sample.

Figure 8A:
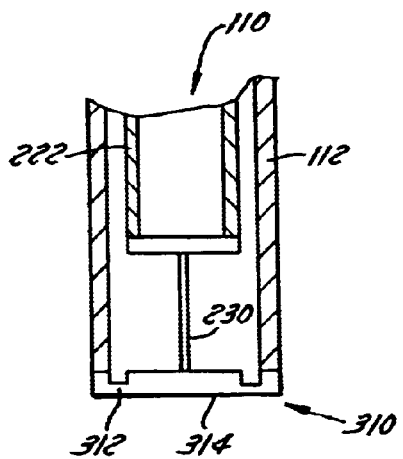
FIGS. 8A and 8B illustrate alternate embodiments of the apparatus shown in FIG. 4.

In an alternative embodiment of an apparatus for isolating "Z," rather than using a parallelogram flexure as shown in FIGS. 4 and 7, a disc-shaped flexure or membrane 310 is employed, as shown in FIG. 8A. Membrane 310 is coupled to a reference structure 112 around its perimeter and has a circumferential joint or trench 312 that defines a perimeter flexure region. Further, membrane 310 has a bottom surface 314 to which the probe assembly (for example, 113 in FIG. 2) can be attached. Membrane 310 allows vertical forces to be transmitted to the probe assembly, due to "flexing" of membrane 310 at trench 312 in response to these forces, yet decouples X-Y motion of the Z-tube 222 to ensure that movement of the probe assembly caused by the Z-actuator remains in Z.

A coupling element or member 230, which in operation is generally flexible in response to displacements directed in the X and Y-directions, for example, and is generally stiff in response to displacement directed in the Z-direction, is used to couple the actuator 110 to membrane 310. Because membrane 310 is coupled to the reference structure 112 around its entire circumference, membrane 310 is generally non-responsive to displacements directed orthogonally to the longitudinal axis of actuator 110, thus decoupling these displacements from the probe assembly. Notably, these displacements in the X and Y-directions are absorbed by flexible coupling member 230, thus minimizing the effects of parasitic movement of Z-tube 222. To the contrary, lateral motion generated by the actuator 110 which is transmitted by structure 112, is transferred to the probe, as required. Ideally, membrane 310, referring to FIG. 8B, may be made of a metal, or polymer, or other suitable material.

Figure 8B:
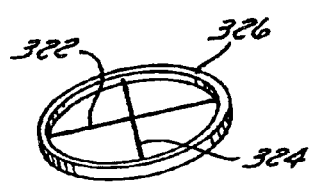

Referring to FIG. 8B, in another alternate embodiment of a flexure for isolating "Z," similar to that shown in FIG. 8A, a pair of cross wires 322, 324 disposed generally orthogonally to one other are attached at their opposed ends to a mounting ring 326 that, in turn, is attached to a reference structure (for example, 112 in FIG. 8A). Again, a coupling element or member (230 in FIG. 8A) is employed to couple actuator 110 to the junction of cross wires 322, 324. Moreover, a probe assembly is coupled to wires 322, 324 and thus moves in corresponding fashion with wires 322, 324.

Similar to disc-shaped member 310, wires 322, 324 are generally adapted to decouple displacements directed in the X and Y-directions and transmit displacement directed in the Z-direction. In operation, wires 322, 324 and member 230 interact to couple vertical displacement generated by the Z-tube actuator attached thereto to the cantilever probe attached thereto, yet decouple X-Y displacements of the Z-tube actuator (these displacements typically being absorbed by member 230) to ensure that movement of the probe assembly generally remains in Z.

Figure 9:
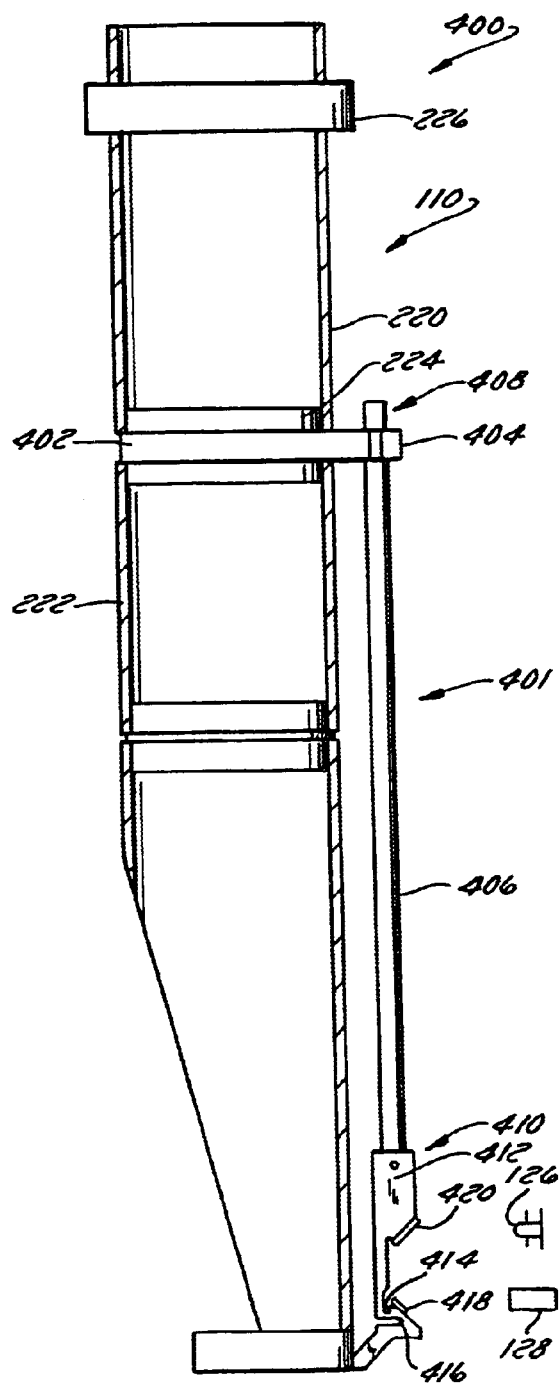
FIG. 9 is a partial side elevation cross-sectional view of an alternate embodiment of the present invention.

Turning next to FIG. 9, an alternative embodiment of the actuator assembly 104 of the present invention is shown. In particular, an actuator assembly 400 decouples X-Y movement (e.g., X-Y movement of an X-Y actuator 220) from the measurement of the amount of vertical movement produced by Z-actuator 222. Actuator assembly 400 comprises an actuator 110 which in turn preferably comprises a piezoelectric tube actuator, a reference assembly 401, and a probe assembly (not shown). Moreover, piezoelectric tube actuator comprises X-Y tube 220 and Z-tube 222.

Reference assembly 401 includes a circular mount 402 having a clamp 404 and a rod 406 having a longitudinal axis generally parallel to, and displaced from, the longitudinal axis of tube actuators 220, 222. Clamp 404 is employed to couple a first end 408 of rod 406 to a coupler 224 of actuator 110. A second end 410 of rod 406 is coupled to a flexure 412 of reference assembly 401. Flexure 412 is, in turn, coupled to Z-tube 222. Flexure 412 includes two joints 414, 416. In addition, mirrors 418, 420 are attached to flexure 412 such that their reflecting surfaces are generally orthogonal to one another, thus forming a structure akin to a corner-cube retro-retroreflector, similar to that described above in conjunction with FIG. 7. Preferably, reflecting elements 418, 420 are front surface mirrors.

In operation, a light beam generated by a source 126 is directed at mirror 420 which reflects the beam towards mirror 418 which, in turn, reflects the beam towards detector 128 for measuring the amount of vertical deflection. As Z-tube 222 is actuated, the portion of flexure 412 having mirror 418 on it rotates about joints 414, 416 such that mirror 418 reflects the beam at an angle indicative of the amount of the movement. Most notably, lateral movement of actuator 110 (for example, generated by X-Y tube 220) for scanning a sample (not shown) is decoupled from this Z-measurement. In particular, rod 406 is independent of movement of the Z-tube 222 because it is attached at clamp 404 at a point on actuator 110 above the top of Z-tube 222. As a result, rod 406 moves when X-Y tube 220 is actuated but not when Z-tube 222 is actuated. When flexure 412 rotates about joints 416, 418 in response to vertical movement of Z-tube 222, vertical movement of the probe can be accurately measured notwithstanding simultaneous movement caused by X-Y tube 220. This is primarily due to the mirrors 418, 420 always generally maintaining their orthogonal relationship. As a result, the measurement of Z is isolated from X-Y movement generated by tube 220.

Next, to determine the height of the surface, the height of the probe above (or in contact with) the surface must be monitored and controlled.

Referring again to FIGS. 2 and 7, in one mode of operation, the stylus 115 is in contact with the sample, and slight deflections of the cantilever 114 caused by its moving over the sample are measured. This is called "contact" mode. As the stylus 115 is deflected upwards, it moves cantilever 114 and mirror 117. This change in the position of mirror 117 causes the reflected light to move across detector 109 (shown in FIG. 2). The output of the detector 109 is fed back to the Z-tube 222. Thus, flexing of the cantilever 114 is a function of the signal provided by detector 109. In typical operation, the amount of flexing of cantilever 114 is maintained constant by extending or retracting Z-tube 222 (e.g., lengthening or shortening) in response to a signal based on the output of the detector 109. When the stylus 115 reaches a surface asperity that causes the cantilever 114 to flex upward, therefore deflecting light with respect to detector 109, the SPM attempts to restore the cantilever 114 to the same position on or above the surface of the sample. This capability is provided by data acquisition and control module 500 shown in FIG. 10, that extends or retracts Z-tube 222 in order to restore cantilever 114 to its original deflection.

In Tapping Model™ operation, an oscillator (not shown) causes the free end of cantilever 114 to oscillate up-and-down, typically at or near its resonant frequency. As probe assembly 113 approaches the surface of the sample, interaction between the surface 108 and the stylus 115 causes the amplitude (or phase) of these oscillations to change. The angle of the radiation reflected from mirror 117 changes in amplitude accordingly and causes a change in the location of the reflected light incident upon detector 109. Detector 109, in turn, generates a signal indicative of the changed amplitude and provides this signal to the control circuitry shown in detail in FIG. 10. The control circuitry in turn provides a control signal to Z-tube 222 to adjust its length to move the stylus 115 up or down until the cantilever 114 returns to the desired oscillation amplitude. The control signal is thus indicative of surface features of the sample 108.

Figure 10:
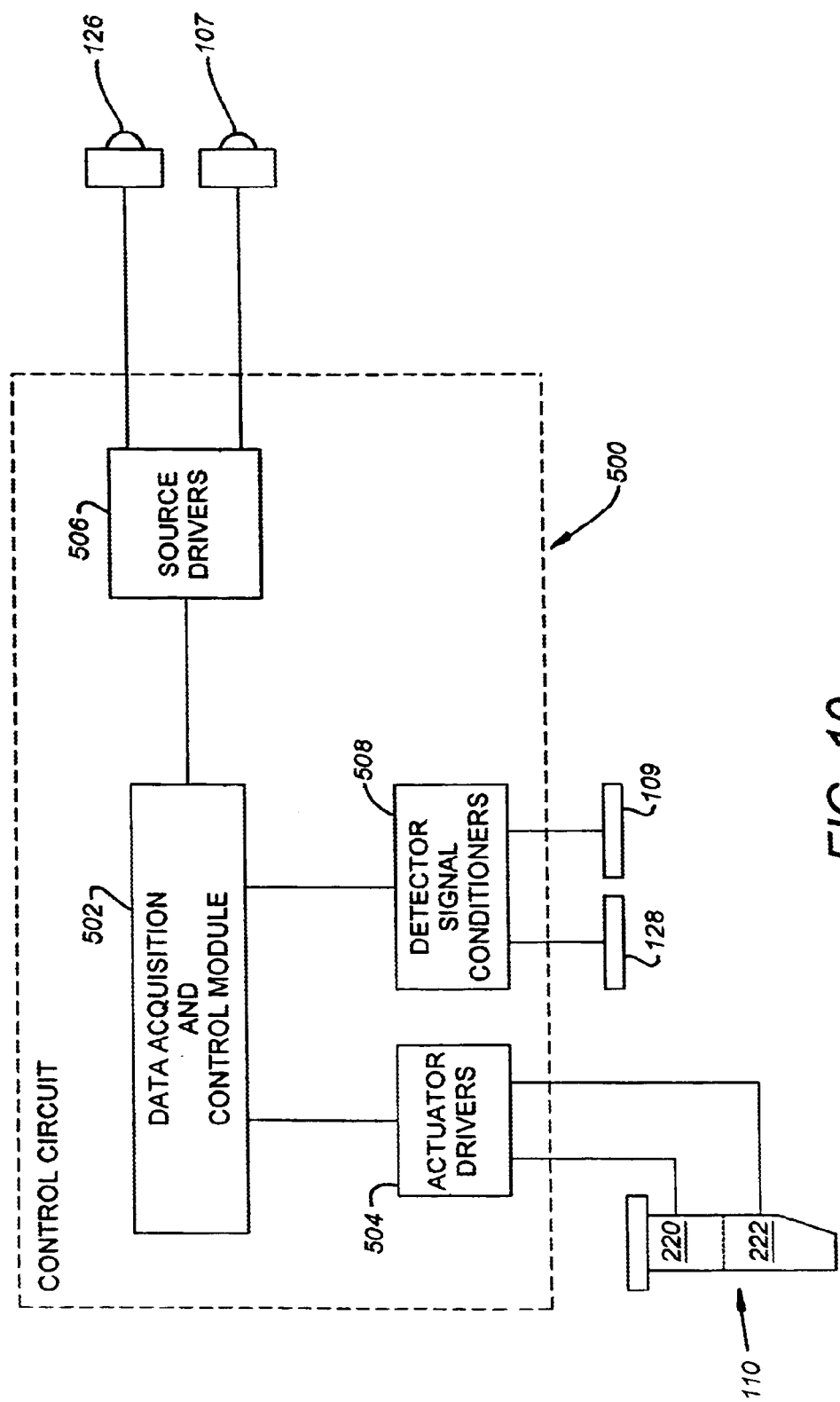
FIG. 10 is a schematic diagram of a control circuit configured to monitor the radiation detectors, control the piezoelectric actuator and save data indicative of the three-dimensional location of scan points on the surface of the sample.

Referring still to FIG. 10, a control circuit 500 is shown connected to sections 220 and 222 of an actuator 110, such as a piezoelectric tube actuator, detectors 128 and 109, and sources 126 and 107. Control circuit 500 includes data acquisition and control module 502 which is coupled to and drives actuator drivers 504 and, source drivers 506. Actuator drivers 504 are in turn coupled to tube actuators 220 and 222 of actuator 110. These drivers 504 generate high voltage signals necessary to cause X-Y tube 220 to move laterally and Z-tube 222 to expand and contract vertically. Source drivers 506 are coupled to and drive radiation sources 126 and 107. Control module 502 is also coupled to and receives signals from detector signal conditioner 508. Signal conditioner 508 receives the raw signals from the two radiation detectors 128, 109 and converts them into signals that can be read by control module 502.

Control module 502 includes a series of instructions that controls the operation of control circuit 500 and hence, the operation of actuator 110. This includes instructions that receive and process signals transmitted from detector signal conditioners 508 that are indicative of the radiation falling on detectors 109 and 128. The instructions also include instructions that transmit appropriate signals to actuator drivers 504 causing actuator drivers 504 to generate the appropriate high voltage signals to tubes 220 and 222 of actuator 110. Module 502 also includes instructions to generate signals and transmit them to source drivers 506 causing source drivers 506 to properly control the radiation emitted by sources 107 and 126.

Control module 502 monitors changes in the signal generated by detector 109 and determines, based upon changes in the signal, that the cantilever 114 has been deflected, either upwardly or downwardly in contact mode, or that its amplitude of oscillation, in Tapping Mode®, has increased or decreased. In response to this signal, the controller 502 attempts to raise or lower the probe assembly 113 until the signal generated by detector 109 returns to its original level. To do this, the control module 502 generates a signal and applies it to Z-tube 222 of the piezoelectric tube actuator 110, which in turn causes it to contract or expand depending on the signal. This contraction or expansion pulls flexible bar coupling 230 upwardly or downwardly, which in turn pulls link 232B upwardly or pushes it downwardly, respectively. Link 232B is mechanically coupled to the fixed end of cantilever 114 causing it to move with bar 230. This motion of the fixed end of cantilever 114 causes mirror 117 to be restored to its original orientation, and hence, causes the light falling on detector 109 to generate its original signal levels. These restored signal levels are sensed by control module 502 which then stops changing the signal applied to Z-tube 222. In summary, the height information is interpreted from the voltage fed to the Z-tube 222. Specifically, the voltage fed to the Z-tube 222 as part of the usual feedback process of maintaining a constant cantilever amplitude or deflection is also read by the data acquisition and control module 502 as an indication of sample asperity height.

In accordance with the novel principles of the present invention, accurate Z-height information is independently derived from detector 128 while the usual feedback process described above continues. Specifically, the control module 502 uses the signal provided by detector 128 to determine the height of probe assembly 113 in the following manner. Again, we will assume that the stylus 115 is being translated across the surface of sample 108 and reaches an asperity. As in the previous case, this will flex cantilever 114 upwardly in contact mode or reduce the amplitude of oscillation of the cantilever 114 in Tapping Mode® and cause the signal to change at detector 109. Again, the controller 502 will cause section 222 to contract by changing the signal applied to it. This, in turn, causes flexure 232 to move upwardly. As shown in FIG. 7, this upward motion causes mirror 242 to deflect downwardly and outwardly away from mirror 240 and causes the light generated by source 126 to fall on a different portion of detector 128. The signal that falls on detector 128 is a function of the height of flexure 232, and hence t he height of the fixed end of cantilever 114. In this case, therefore, controller module 502 reads the signal generated by detector 128 and determines the height of flexure 232 (and hence, probe assembly 113) directly.

The preferred embodiment also avoids another positional error due to lateral deflection of Z-tube 222 when it contracts or expands. It is important in most measuring processes to determine not only the height of the surface of sample 108, but also the location at which that height measurement occurred. As we explained in the background of the invention, Z-tube 222 undesirably deflects laterally when it contracts or expands. Without reference structure 112, this would cause the probe to steer slightly forward, backward, to the left, or to the right across the surface of the sample, rather than moving straight upwardly or downwardly. Link 232B, which translates upwardly and downwardly together with flexure 232 and the probe itself, is isolated from these lateral deflections of Z-tube 222. It communicates only the expansion and contraction of Z-tube 222 to the probe.

The four bar linkage of flexure 232 ensures that the probe itself can only translate upwardly and downwardly with respect to member 112. It is flexible bar coupling 230 that absorbs this lateral motion and prevents it from being communicated to probe assembly 113 when Z-tube 222 expands or contracts. Flexible bar coupling 230 has sufficient flexibility that it can deflect slightly from side to side throughout its length. It is provided with a length sufficient to permit these lateral deflections of the coupling 230 to occur without introducing significant errors into the system. In this manner, member 112 is isolated from longitudinal motion of the piezoelectric actuator 110, but will communicate (X,Y) plane motions to flexure 232. Flexible bar coupling 230, flexure 232 and particularly link 232B are isolated from lateral movement generated by the expansion and contraction of Z tube 222, yet substantially duplicate the upward and downward motion of Z-tube 222 and transmit it to probe assembly 113.

The scope of the application is not to be limited by the description of the preferred embodiments described above, but is to be limited solely by the scope of the claims which follow.

What is claimed is:

1. An assembly for a metrology apparatus, the assembly comprising:
    an actuator including a first actuator stage configured to controllably move in first and second orthogonal directions, and a second actuator stage adjacent to said first actuator stage and configured to controllably move in a third direction orthogonal to the first and second orthogonal directions;
    a reference structure having first and second ends wherein the first end is fixed relative to movement of said second actuator stage;
    a multi-bar linkage assembly fixed to said second end of the reference structure; and
    a coupling coupled to said second actuator stage and to said multi-bar linkage, wherein said second actuator stage and the coupling are configured to move said linkage in the third orthogonal direction in a manner that substantially isolates the linkage from any second actuator stage motion in the first and second directions.

2. The assembly of claim 1, wherein said actuator is tubular in shape, having a substantially circular cross section.

3. The assembly of claim 2, wherein the first and second orthogonal directions lie in a plane perpendicular to a longitudinal axis of said first actuator stage.

4. The assembly of claim 3, wherein said reference structure is substantially coaxial with said actuator.

5. The assembly of claim 1, wherein said multi-bar linkage is a four bar parallelogram with two pairs of substantially parallel links.

6. The assembly of claim 5, wherein said multi-bar linkage further includes four flexible joints, and further wherein said four linkages and said four joints are machined out of a solid block of linkage material.

7. The assembly of claim 6, wherein at least one of said links of said multi-bar linkage includes a mirror that is deflected about at least one of said four joints whenever said second actuator stage extends or retracts.

8. The assembly of claim 1, wherein the metrology apparatus is a scanning probe microscope.

9. The assembly of claim 1, wherein said actuator is a piezoelectric actuator.

10. An assembly comprising:
    an actuator with a longitudinal axis having a fixed end, and a free end configured to translate in three orthogonal directions with respect to said fixed end;
    a multiple bar linkage having first and second links mutually constrained to translate with respect to each other, and wherein said first link is fixed to a reference structure and said second link is constrained to translate in a direction generally parallel to the longitudinal axis of said actuator; and
    a coupling having first and second ends, said first end being fixed to said actuator proximate to its free end, and said second end being fixed to said second link, the coupling adapted to transmit displacement in a direction substantially parallel to the longitudinal axis of said actuator.

11. The assembly of claim 10, wherein said actuator has a Z-axis translating section, and an X and Y-axis translating section disposed between said fixed end and said Z-axis translating section.

12. The assembly of claim 11, wherein said reference structure is mechanically independent from translation of said z-axis translating section, but mechanically responsive to said X and Y-axis translating section.

13. The assembly of claim 12, wherein said reference structure is fixed to said multiple bar linkage to deflect said multiple bar linkage in X and Y-directions in response to X and Y-deflections of said X and Y-axis translating section.

14. The assembly of claim 13, wherein said multiple bar linkage further includes a first mirror fixed to at least one of said links of the multiple bar linkage, and a second mirror fixed to another of said links of said multiple bar linkage.

15. The assembly of claim 14, wherein the assembly is adapted to be supported in a chassis, and further wherein said first mirror is disposed in the path of a light beam from a light source mounted on said chassis and is disposed to reflect the light toward said second mirror.

16. The assembly of claim 15, wherein said assembly and said chassis together define a scanning probe microscope.

17. The assembly of claim 10, wherein said actuator is a piezoelectric actuator.

18. In an assembly for a metrology apparatus having a probe assembly, the assembly including an elongate actuator with a longitudinal axis and having a first end configured to be coupled to a frame of the microscope and a free end configured to be coupled to the probe assembly, wherein the elongate actuator is configured to provide controllable translation in three orthogonal directions upon application of proper electrical stimuli, a method of reducing positioning errors at the free end of the elongate actuator comprising the steps of:
supporting the probe assembly on a probe support assembly;
supporting the probe support assembly at a first end of the probe support assembly to a reference structure of the metrology apparatus, the reference structure being substantially insensitive to longitudinal expansion or contraction of the elongate actuator;
isolating the reference structure from a longitudinal tube deflection of the elongate actuator;
driving a longitudinally expanding and contracting portion of the elongate actuator;
simultaneously generating both longitudinal deflections as well as lateral deflections in the longitudinally expanding and contracting portion as a result of said driving step; and
preventing the lateral deflections generated in the longitudinally expanding and contracting portion of the elongate actuator from laterally deflecting the probe support assembly while simultaneously transmitting the longitudinal deflections to the probe support assembly.

19. The method of claim 18, wherein a second portion of the elongate actuator is configured to provide translation in a plane substantially perpendicular to the longitudinal direction, and wherein the method further includes the steps of:
driving the second portion of the elongate actuator;
generating lateral deflections in the second portion as a result of said driving the second portion step; and
transmitting the lateral deflections in the second portion to the probe support assembly.

20. The method of claim 18, further comprising the step of monitoring a deflection of the probe support assembly while substantially simultaneously monitoring a deflection of the probe assembly.

21. A scanning probe microscope assembly, comprising:
a microscope frame;
a piezoelectric actuator having a first end fixed to said frame and a second free end wherein, said piezoelectric actuator is movable in three orthogonal directions;
a first reflector assembly fixed to a reference structure proximate to said free end of said piezoelectric actuator;
a first electromagnetic radiation source fixed with respect to said frame and disposed to direct radiation onto said first reflector assembly;
a first electromagnetic radiation detector disposed to receive light from said first source after said light has been received and reflected by said first reflector assembly and to generate a signal indicative of a degree of longitudinal deflection of said piezoelectric actuator; and
wherein said piezoelectric actuator cannot move said reference structures in at least one of the three orthogonal directions.

22. The scanning probe microscope assembly of claim 21, further comprising a cantilevered probe having a free end and a fixed end and fixed at its fixed end to said second free end of said piezoelectric actuator, said probe including a second reflector disposed to translate with said probe when said probe is deflected with respect to said piezoelectric actuator.

23. The scanning probe microscope assembly of claim 22, further comprising a second electromagnetic radiation detector disposed to receive light reflected from said second reflector and to generate a signal indicative of a degree of deflection of said free end of said probe with respect to said fixed end of the probe.

24. An apparatus for measuring movement of an actuator in a metrology apparatus, the measuring apparatus comprising:
an optical measuring device including a light source that generates a light beam, said measuring device being configured to change the direction of said beam in response to movement of the actuator;
a reference structure coupled to at least a portion of the actuator;
a sensor to detect said beam and generate a signal indicative of the movement of the actuator; and
wherein the actuator is movable in three orthogonal directions.

25. The apparatus of claim 24, wherein said light source is a laser.

26. The apparatus of claim 24, wherein said measuring device includes a movable bar assembly coupled to the actuator and to said reference structure, said bar assembly having a reflecting surface that is adapted to deflect said beam, and wherein said bar assembly is responsive to movement of the actuator so as to change the direction of said deflected beam.

27. The apparatus of claim 26, wherein said bar assembly includes a first link having a first end attached to the actuator and a second end, and a second link defining said reflecting surface and having a first opposed end rotatably attached to said second end and a second opposed end rotatably attached to said reference structure.

28. The apparatus of claim 26, wherein said reference structure is tubular and generally surrounds the actuator.

29. The apparatus of claim 28, wherein said reference structure is configured to allow said light beam and said deflected beam to pass therethrough.

30. The apparatus of claim 29, wherein said reference structure has an inner surface.

31. The apparatus of claim 30, further including a reflective surface fixed to said inner surface to steer said beam toward said reflecting surface.

32. The apparatus of claim 26, wherein said bar assembly includes a link having opposed ends, a first opposed end rotatably attached to the actuator and a second opposed end rotatably attached to said reference structure.

33. The apparatus of claim 26, wherein said bar assembly comprises a four bar linkage including first and second reflecting surfaces, said surfaces disposed to reflect light such that the incoming and outgoing beams are generally parallel.

34. The apparatus of claim 24, wherein said optical measuring device includes a lens disposed intermediate said light source and said sensor.

35. The apparatus of claim 34, wherein said lens has a magnification equal to 1+i/o, wherein "i" equals the orthogonal distance between said lens and said sensor, and "o" equals the orthogonal distance between said lens and said light source.

36. The apparatus of claim 34, wherein said light source is mounted to the actuator.

37. The apparatus of claim 36, wherein said lens has a magnification equal to i/o, wherein "i" equals the orthogonal distance between said lens and said sensor, and "o" equals the orthogonal distance between said lens and said light source.

38. The apparatus of claim 24, wherein the metrology apparatus is a scanning probe microscope.

39. The apparatus of claim 24, wherein the actuator is a piezoelectric actuator.

40. A method for measuring movement of an actuator in a metrology apparatus, the method comprising:
providing a movable bar assembly coupled to the actuator and to a reference structure; and
measuring, in response to movement of the actuator, movement of said movable bar assembly, wherein movement of said movable bar assembly is indicative of movement of the actuator.

41. The method of claim 40, wherein said movable bar assembly includes a first link having a first end attached to the actuator and a second end, and a second link defining said reflecting surface and having a first opposed end rotatably attached to said second end and a second opposed end rotatably attached to said reference structure.

42. An apparatus for measuring movement of an actuator, the apparatus comprising:
an optical measuring device including a source of electromagnetic radiation that generates a beam;
a reference structure coupled to at least a portion of the actuator;
a sensor that detects a position of said beam; and
wherein the actuator is movable in three orthogonal directions but cannot move said reference structure in at least one of the three orthogonal directions, and wherein, in response to movement of the actuator, said optical measuring device changes the position of said beam.

43. The apparatus of claim 42, further including a reference frame wherein said reference frame has a longitudinal axis that is generally co-linear with the longitudinal axis of the actuator.

44. The apparatus of claim 43, wherein said measuring device includes a movable bar assembly that is attached to said actuator at a first end of said bar assembly, and is attached to said reference frame at a second end of said bar assembly, and wherein said bar assembly defines a reflecting surface that reflects said beam towards said sensor.

45. The apparatus of claim 44, wherein said reference frame includes an inner surface and said measuring device further comprises a reflective surface fixed to said inner surface that steers said beam towards said reflecting surface, said reflecting surface deflecting said beam towards said sensor.

46. The apparatus of claim 44, wherein said reference frame is configured to allow said beam and said deflected beam to pass therethrough.

47. The apparatus of claim 42, wherein said source is coupled to the actuator and directs the beam generally orthogonally to the movement of the actuator.

48. The apparatus of claim 47, wherein said measuring device further includes a lens intermediate said source and said sensor to focus said beam towards said sensor.

49. The apparatus of claim 42, wherein said source is fixed relative to the actuator and directs the beam generally orthogonally to the movement of the actuator.

50. The apparatus of claim 42, wherein said measuring device includes a lens that moves in conjunction with the actuator.

51. The apparatus of claim 42, wherein the actuator is a piezoelectric actuator.

52. In a metrology apparatus having an actuator for moving a probe in a particular direction, a reference assembly that generally decouples movement of the apparatus in a direction other than the particular direction from the probe, the reference assembly comprising:
a reference structure;
a probe support assembly coupled to said reference structure and to the actuator, the probe being attached to the probe support assembly; and
a flexible bar having opposed ends, one of which is coupled to the actuator and the other of which is coupled to the probe support assembly, wherein said flexible bar, said reference structure, and said probe support assembly are adapted to collectively decouple movement of the microscope in the direction other than the particular direction from the probe.

53. The apparatus of claim 52, wherein said reference structure is a tubular frame and has a longitudinal axis that is generally collinear with the longitudinal axis of the actuator.

54. The apparatus of claim 52, wherein said flexible bar is more flexible in response to displacements applied thereto in any direction other than the particular direction than to a displacement applied in the particular direction.

55. The apparatus according to claim 54, wherein the particular direction is the Z-direction.

56. The apparatus according to claim 52, wherein said probe support assembly is a parallelogram flexure.

57. The apparatus of claim 52, wherein said probe support assembly comprises a four bar linkage having four joints.

58. The apparatus of claim 57, wherein said four bar linkage moves in response to movement by the actuator in the particular direction.

59. The apparatus of claim 52, wherein said probe support assembly is a flexible disc, said flexible disc being attached to said reference structure generally around a perimeter of said flexible disc.

60. The apparatus of claim 59, wherein said flexible disc has a circumferential flexure region that allows said flexible disc to move in the particular direction.

61. The apparatus of claim 52, wherein said probe support assembly is a pair of flexible cross wires.

62. The apparatus of claim 52, wherein said probe support assembly moves in response to a displacement applied thereto which is directed in the particular direction, and generally does not move in response to displacements applied thereto in any direction other than the particular direction.

63. The apparatus of claim 52, wherein the metrology apparatus is a scanning probe microscope.

* * * * *